US008983374B2

(12) United States Patent
Wiley (10) Patent No.: US 8,983,374 B2
(45) Date of Patent: Mar. 17, 2015

(54) RECEIVER FOR NEAR FIELD COMMUNICATION AND WIRELESS POWER FUNCTIONALITIES

(75) Inventor: George A. Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 13/224,047

(22) Filed: Sep. 1, 2011

(65) Prior Publication Data
US 2012/0149301 A1  Jun. 14, 2012

Related U.S. Application Data (60) Provisional application No. 61/422,628, filed on Dec. 13, 2010.

(51) Int. Cl.
  H04B 5/00 (2006.01)
  H04B 7/00 (2006.01)
  H04B 1/38 (2006.01)
  H02J 5/00 (2006.01)

(52) U.S. Cl.
  CPC ............ H04B 5/0031 (2013.01); H04B 5/0037 (2013.01); H02J 5/005 (2013.01)
  USPC .......... 455/41.1; 455/41.2; 455/572; 455/573

(58) Field of Classification Search
  CPC ...... H02J 5/005; H04B 5/0031; H04B 5/0037
  USPC ................................ 455/41.1, 41.2, 573, 572
  See application file for complete search history.

(56) References Cited

U.S. PATENT DOCUMENTS

| | | | |
|---|---|---|---|
| 5,536,979 A | 7/1996 | McEachern et al. | |
| 2005/0063488 A1 | 3/2005 | Troyk et al. | |
| 2005/0077356 A1 | 4/2005 | Takayama et al. | |
| 2006/0145660 A1 | 7/2006 | Black et al. | |
| 2007/0228833 A1 | 10/2007 | Stevens et al. | |
| 2008/0039903 A1 | 2/2008 | Chadwick | |
| 2008/0272889 A1* | 11/2008 | Symons ...................... | 340/10.1 |
| 2009/0001930 A1 | 1/2009 | Pohjonen | |

(Continued)

FOREIGN PATENT DOCUMENTS

CN  1954472 A  4/2007
CN  101656436 A  2/2010

(Continued)

OTHER PUBLICATIONS

International Search Report and Written Opinion—PCT/US2011/064270, ISA/EPO—May 7, 2012.

(Continued)

*Primary Examiner* — Ping Hsieh
*Assistant Examiner* — Xin Jia
(74) *Attorney, Agent, or Firm* — Knobbe, Martens, Olson & Bear LLP (57) ABSTRACT

Exemplary embodiments are directed to a coexistence of NFC and wireless power functionalities. A device may include an antenna configured to receive a signal. The device may further include a communication circuit configured to selectively couple to the antenna in a default mode of operation. The device may further include a wireless power circuit configured to selectively couple to the antenna in response to detecting that the signal is provided to power or charge a load.

47 Claims, 9 Drawing Sheets

(56) References Cited

U.S. PATENT DOCUMENTS

| | | |
|---|---|---|
| 2010/0190436 A1 | 7/2010 | Cook et al. |
| 2010/0225270 A1 | 9/2010 | Jacobs et al. |
| 2010/0225272 A1* | 9/2010 | Kirby et al. .................. 320/108 |
| 2010/0279606 A1* | 11/2010 | Hillan et al. ................. 455/41.1 |
| 2011/0050164 A1 | 3/2011 | Partovi et al. |

FOREIGN PATENT DOCUMENTS

| | | |
|---|---|---|
| EP | 1096641 A1 | 5/2001 |
| EP | 1575183 A1 | 9/2005 |
| EP | 2157705 A2 | 2/2010 |
| EP | 2251836 A2 | 11/2010 |
| GB | 2429372 | 2/2007 |
| JP | 7154288 A | 6/1995 |
| JP | 2001307032 A | 11/2001 |
| JP | 2003069335 A | 3/2003 |
| JP | 2004342040 A | 12/2004 |
| JP | 2011154435 A | 8/2011 |
| JP | 2012503466 A | 2/2012 |
| JP | 2013084243 A | 5/2013 |
| WO | WO9749076 A1 | 12/1997 |
| WO | 0057531 A1 | 9/2000 |
| WO | WO-2005109597 A1 | 11/2005 |
| WO | WO-2010035256 A2 | 4/2010 |
| WO | WO2010093969 | 8/2010 |
| WO | WO2010093973 | 8/2010 |

OTHER PUBLICATIONS

Van Boheemen, E.L. et al., "Near-field coupled antennas for use in Inductive Power Transfer Communication Systems", Industrial Electronics, 2008. IECON 2008. 34th Annual Conference of IEEE, Issue Date: Nov. 10-13, 2008, pp. 1504-1509.

* cited by examiner

RECEIVER FOR NEAR FIELD COMMUNICATION AND WIRELESS POWER FUNCTIONALITIES

CLAIM OF PRIORITY UNDER 35 U.S.C. §119

This application claims priority under 35 U.S.C. §119(e) to:

U.S. Provisional Patent Application 61/422,628 entitled "SWITCHING BETWEEN NFC AND WIRELESS POWER" filed on Dec. 13, 2010, the disclosure of which is hereby incorporated by reference in its entirety.

BACKGROUND

1. Field

The present invention relates generally to wireless power. More specifically, the present invention relates to methods and devices for selectively switching between a wireless power mode and a near-field communication mode.

2. Background

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus a rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

As will be appreciated by a person having ordinary skill in the art, electronic devices may be configured to transmit and/or receive data via near-field communication (NFC). For example, a device may be configured to communicate with an electronic reader, such as an "Oyster Card" reader. Via NFC, an electronic device may make a payment, gain access through a barrier, or a combination thereof.

A need exists for methods and devices for enabling wireless power and NFC functionality to coexist in an electronic device.

SUMMARY OF THE INVENTION

One aspect of the subject matter described in the disclosure provides a device including an antenna configured to receive a signal. The device further includes a communication circuit configured to selectively couple to the antenna in a default mode of operation. The device further includes a wireless power circuit configured to selectively couple to the antenna in response to detecting that the signal is provided to power or charge a load.

Another aspect of the subject matter described in the disclosure provides an implementation of a method. The method includes operating a communication circuit in a default mode. The method further includes activating a wireless power circuit in response to detecting that a received signal is provided to power or charge a load.

Yet another aspect of the subject matter described in the disclosure provides a device. The device includes means for receiving a signal. The device further includes means for communication configured to selectively couple to the means for receiving a signal in a default mode of operation. The device further includes means for wirelessly receiving power configured to selectively couple to the antenna in response to detecting that the signal is provided to power or charge a load.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted between a transmitter and a receiver without the use of physical electrical conductors. Hereafter, all three of these will be referred to generically as radiated fields, with the understanding that pure magnetic or pure electric fields do not radiate power. These must be coupled to a "receiving antenna" to achieve power transfer.

Figure 1:
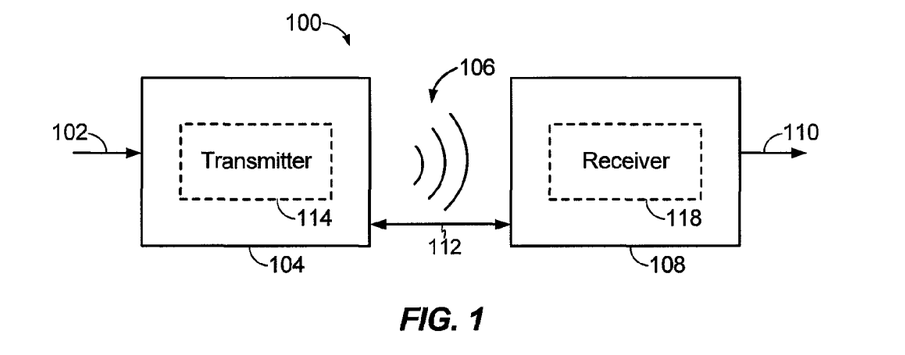
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a field 106 for providing energy transfer. A receiver 108 couples to the field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
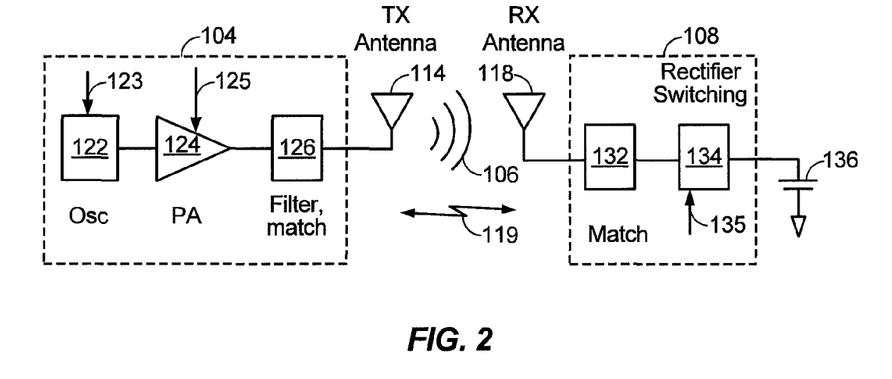
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, such as 468.75 KHz, 6.78 MHz or 13.56 MHz, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the power amplifier 124 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the rectifier and switching circuit 134 to the receive antenna 118. The receiver 108 and transmitter 104 may communicate on a separate communication channel 119 (e.g., Bluetooth, zigbee, cellular, etc).

As described more fully below, receiver 108, which may initially have a selectively disablable associated load (e.g., battery 136), may be configured to determine whether an amount of power transmitted by transmitter 104 and receiver by receiver 108 is sufficient for charging battery 136. Further, receiver 108 may be configured to enable a load (e.g., battery 136) upon determining that the amount of power is sufficient.

Figure 3:
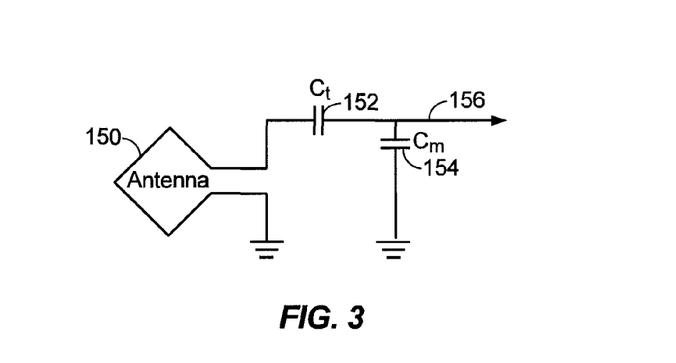
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
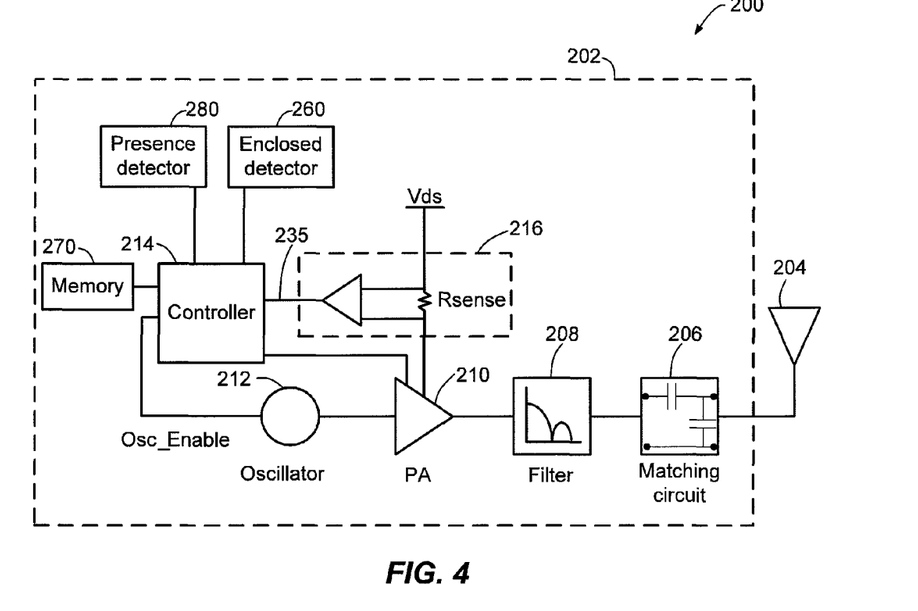
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. It is noted that the controller 214 may also be referred to herein as processor 214. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver. As described more fully below, a current measured at power amplifier 210 may be used to determine whether an invalid device is positioned within a charging region of transmitter 200.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency.

The transmitter 200 may gather and track information about the whereabouts and status of receiver devices that may be associated with the transmitter 200. Thus, the transmitter circuitry 202 may include a presence detector 280, an enclosed detector 260, or a combination thereof, connected to the controller 214 (also referred to as a processor herein). The controller 214 may adjust an amount of power delivered by the amplifier 210 in response to presence signals from the presence detector 280 and the enclosed detector 260. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 260 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
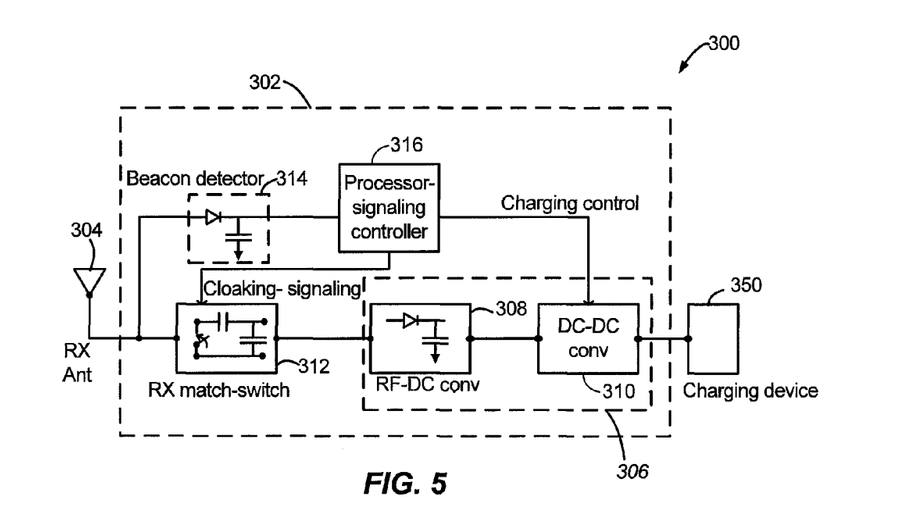
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diameter or length dimension smaller that the diameter or length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for reverse link signaling, peer-to-peer signaling, or both. Further switching circuitry 312 may be used connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Switching of a large capacitive load under control of processor 316 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in energy as a message from the transmitter. From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and peer-to-peer receiver circuitry 314 used to identify received energy fluctuations, which may correspond to informational signaling from other receivers. Furthermore, signaling and peer-to-peer receiver circuitry 314 may also be used to detect the transmission of a reduced RF signal energy (i.e., communications from other receivers) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Processor 316 may also monitor peer-to-peer receiver circuitry 314 to extract messages sent from other receivers. Processor 316 may also adjust DC-to-DC converter 310 for improved performance.

As will be appreciated by a person having ordinary skill in the art, near field communication (NFC) and wireless power (WP) technologies may interfere with each other if operated simultaneously or individually without awareness to the existence of the other. Exemplary embodiments of the invention are related to coexistence of and intelligent switching between NFC and Wireless Power functionalities within a single electronic device (e.g., a mobile telephone). In one exemplary embodiment, a dual-mode system (i.e., a system configured for both NFC operation and wireless power reception) is normally in an NFC acquisition mode with wireless power capability disabled. This allows an associated electronic device to respond substantially instantly to an NFC reader, so there is little or no adverse impact to the performance of the NFC capability. An NFC receiver front-end may include hardware protection to limit or prevent damage from a large wireless power signal in case the electronic device is placed on a wireless power charging pad. Upon the electronic device being positioned within a charging region of a wireless power transmitter, the electronic device may detect a presence of a wireless power transmitter and disable the NFC functionality and enable wireless power functionality. Further, when the wireless power transmitter is no longer detected (i.e., the electronic device is no longer positioned within the charging region), the wireless power functionality may be disabled and the NFC functionality may be enabled.

Figure 6:
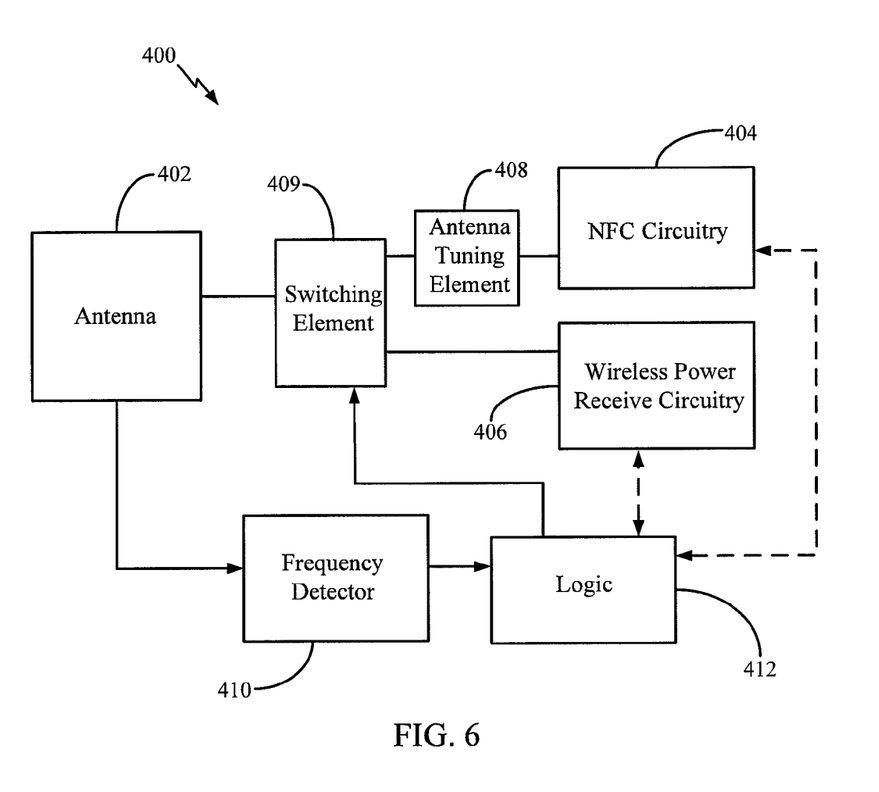
FIG. 6 is a block diagram of a receiver, according to an exemplary embodiment of the present invention.

FIG. 6 is a block diagram of a portion of a receiver 400, according to an exemplary embodiment of the present invention. Receiver 400 includes an antenna 402, which may be configured as a dual-use antenna. More specifically, antenna 402 may be configured for operation in either a wireless power mode or an NFC mode. Receiver 400 further includes NFC circuitry 404, wireless power circuitry 406, and an antenna tuning element 408. Tuning element 408 may be configured to enhance the transfer of a signal from antenna 402 to NFC circuitry 404 by, for example only, matching the impedance of NFC circuitry 404 to antenna 402. Receiver 400 is configured to selectively couple antenna 402 to either wireless power circuitry 406 or NFC circuitry 404 (i.e., via antenna tuning element 408) via a switching element 409, which may comprise one or more switching elements.

Furthermore, receiver 400 includes a frequency detector 410 and logic 412 (e.g., a controller or processor). Frequency detector 410 is coupled between antenna 402 and logic 412 and is configured to detect a frequency of a signal received at antenna 402. For example only, frequency detector 410 may be configured to detect a wireless power frequency, such as 6.78 MHz. Moreover, logic 412 is coupled to switching element 409 and may be adapted for controlling a configuration of switching element 409. Although not required, logic 412 may be coupled to NFC circuitry 404 and wireless power circuitry 406.

According to one exemplary embodiment, antenna 402 may be coupled to NFC circuitry 404 during a default operation or mode (e.g., priority may be given to NFC circuitry). Stated another way, a default configuration of switching element 409 may enable antenna 402 to be selectively coupled to NFC circuitry 404. Accordingly, while in the default configuration, wireless charging functionality may be disabled and NFC functionality may be enabled. Therefore, in the default mode, NFC functionality may respond when receiver 400 is positioned proximate an NFC reader. Furthermore, at any-time during operation, frequency detector 410 may be configured to detect a frequency of a signal received at antenna 402 and, upon detection of a specific frequency (e.g., 6.78 MHz), may convey a notification signal to logic 412. Stated another way, frequency detector 410 may be configured to detect the presence of a wireless power transmitter. Further, logic 412, upon receipt of the notification signal, may convey one or more control signals to switching element 409 to cause antenna 402 to couple to wireless power circuitry 406. As a result, wireless charging functionality may be enabled and NFC functionality may be disabled. According to one example, receiver 400 may be configured for performing NFC at substantially 13.56 MHz and wireless power transfer at substantially 6.78 MHz.

It is noted that frequency detector 410 may continue to monitor frequencies of signals received at antenna 402 while in a wireless charging mode. Furthermore, upon frequency detector 410 failing to detect the specific frequency (e.g., 6.78 MHz) (i.e., frequency detector 410 is no longer detecting the presence of the wireless power transmitter), frequency detector 410 may convey another notification signal to logic 412. Further, logic 412, upon receipt of the notification signal, may convey one or more control signals to switching element 409 to cause antenna 402 to decouple from wireless power circuitry 406 and couple to NFC circuitry 404. As a result, wireless charging functionality may be disabled and NFC functionality may be enabled. It is noted that if a wireless power transmitter is detected during NFC activity, receiver 400 may be configured to delay transition from a NFC mode to a wireless power mode until the NFC activity has finished.

It is further noted that frequency detector 410 may continue to monitor frequencies of signals received at antenna 402 while in wireless charging mode such that the frequency detector 410 may detect that the frequency is configured for communication. In other words, communication signals may be sent while a wireless power transmitter is present and providing power. In this case, logic 412, upon receipt of a notification signal that communications signals are being received, may send control signals to switching element 409 to cause antenna 402 to decouple from wireless power circuitry 406 and couple to NFC circuitry 404. As such, priority may given to communication signal such that NFC circuitry 404 is enabled whenever communication signals are being received according to one exemplary embodiment.

According to another exemplary embodiment, antenna 402 may be coupled to wireless power receive circuitry 406 during a default operation or mode. As such, NFC functionality may be disabled while in the default mode. If the frequency detector 410 detects a specific frequency (e.g., 13.56 MHz), then one or more control signals may be sent to switching element 409 to cause antenna 402 to couple to NFC circuitry 404.

Figure 7:
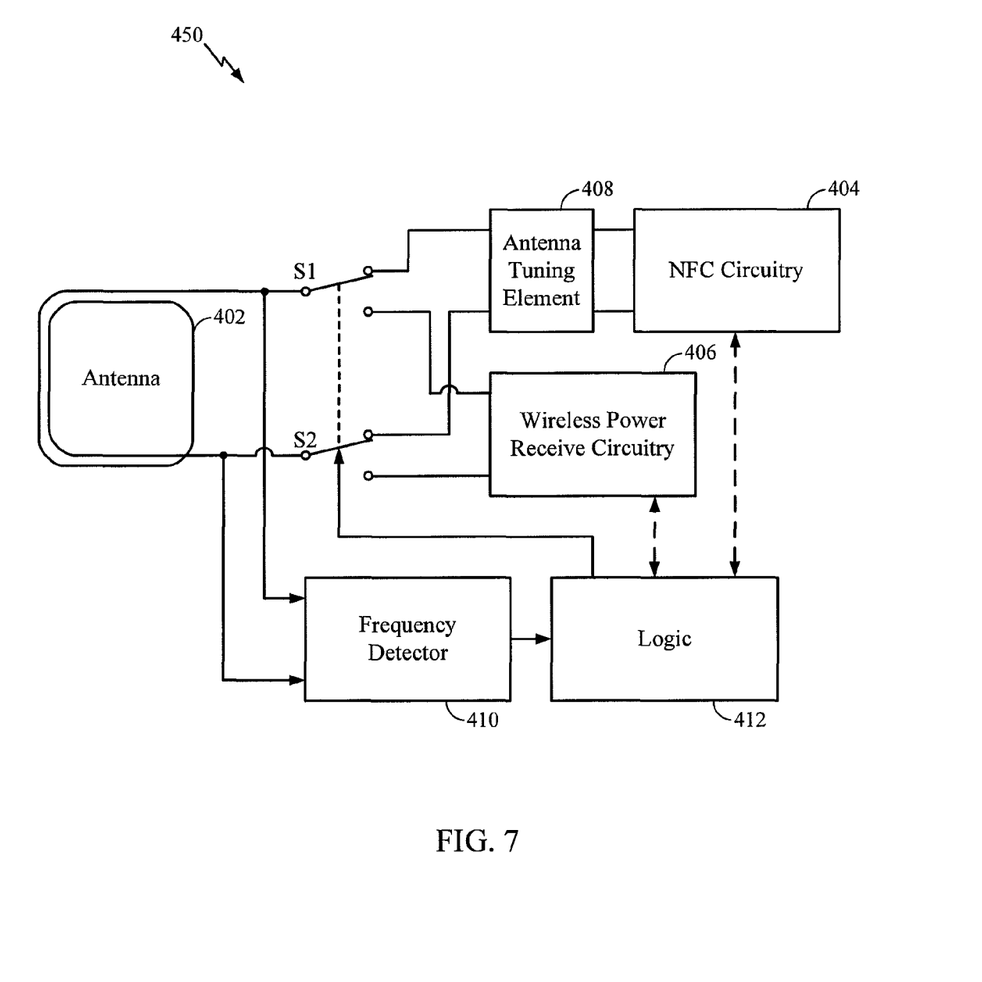
FIG. 7 is an illustration of a receiver, according to an exemplary embodiment of the present invention.

FIGS. 7-11 illustrate various receivers for carrying out exemplary embodiments of the present invention. It is noted that the receivers illustrated in FIGS. 7-11 are examples and the present invention is not limited to the exemplary embodiments illustrated in FIGS. 7-11. FIG. 7 is an illustration of a receiver 450, according to an exemplary embodiment of the present invention. As illustrated in FIG. 7, receiver 450 includes antenna 402, NFC circuitry 404, wireless power circuitry 406, and an antenna tuning element 408. Receiver 450 also includes frequency detector 410 and logic 412. Additionally, receiver 450 further includes switches S1 and S2, which together are configured to selectively couple antenna 402 to either wireless power circuitry 406 or NFC circuitry 404 (i.e., via antenna tuning element 408). Similarly to receiver 400, receiver 450 may be configured to transition from an NFC mode to a wireless power mode upon detection of a wireless power transmitter. More specifically, logic 412, upon receipt of a signal from frequency detector 410, may convey one or more control signals to switches S1 and S2 to couple antenna 402 to either NFC circuitry 404 (i.e., via antenna tuning element 408) or wireless power circuitry 406.

Figure 8:
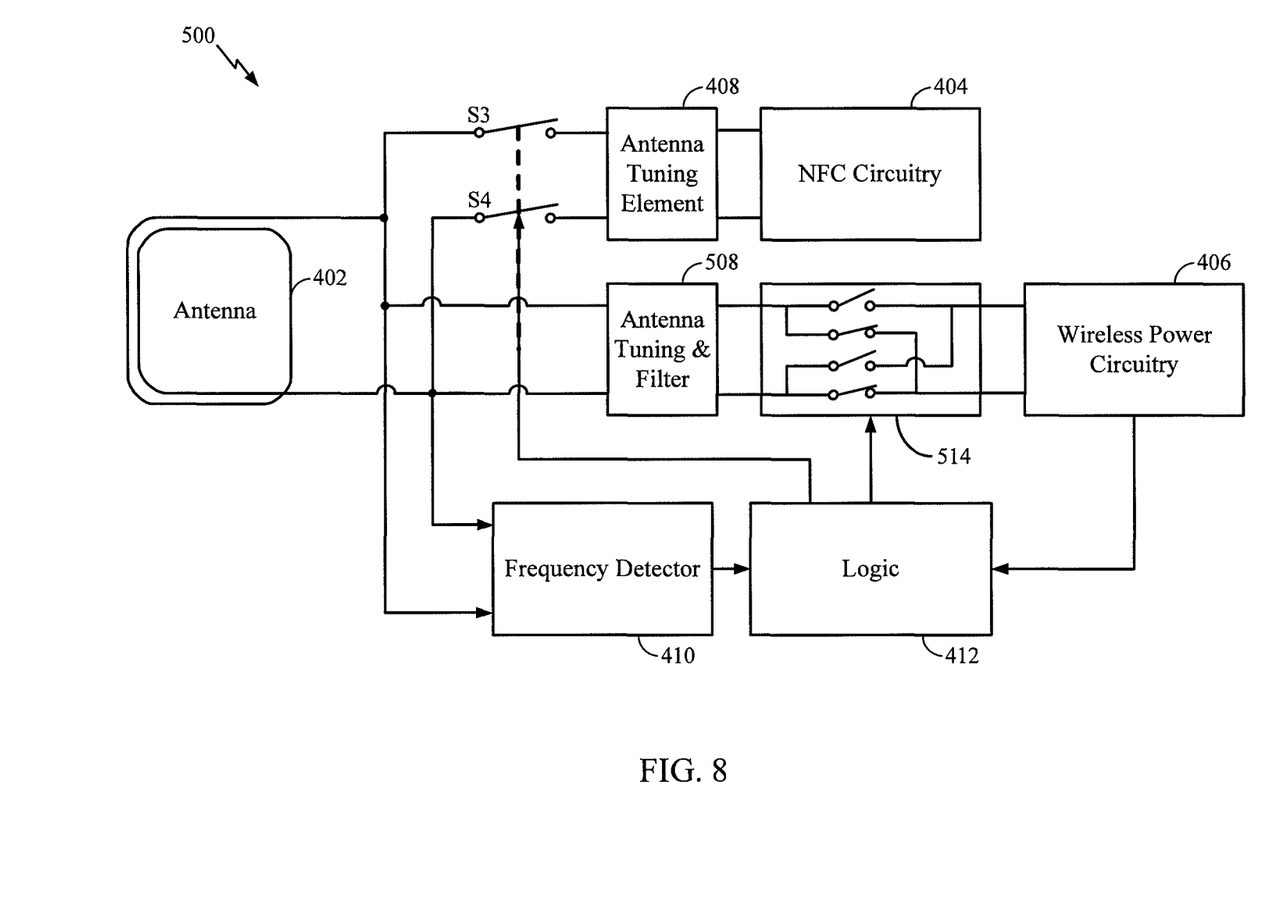
FIG. 8 illustrates another receiver, in accordance with an exemplary embodiment of the present invention.

FIG. 8 is an illustration of another receiver 500, in accordance with an exemplary embodiment of the present invention. Receiver 500 includes antenna 402, frequency detector 410, logic 412, NFC circuitry 404, wireless power circuitry 406, and antenna tuning element 408. Additionally, receiver 500 includes an antenna tuning and filter element 508 and a synchronous rectifier 514, each of which are coupled between antenna 402 and wireless power circuitry 406. Antenna tuning and filter element 508 may be configured to enhance the efficiency of power transfer between antenna 402 and wireless power circuitry 406, and filter any undesired signals. For example only, antenna tuning and filter element 508 may comprise a low-pass filter. Rectifier 514 may include a plurality of actively-controlled switches and may be configured to either selectively couple antenna 402 to wireless power circuitry 406 via antenna tuning and filter element 508 or selectively decouple antenna 402 from wireless power circuitry 406.

In the exemplary embodiment illustrated in FIG. 8, antenna 402 is operably coupled to each of frequency detector 410 and antenna tuning and filter element 508. Receiver 450 further includes switches S3 and S4, which together are configured to selectively couple antenna 402 to NFC circuitry 404 (i.e., via antenna tuning element 408). Similarly to receiver 400, receiver 450 may be configured to transition from an NFC mode to a wireless power mode upon detecting the presence of a wireless power transmitter. More specifically, logic 412, upon receipt of a signal from frequency detector 410, may convey one or more control signals to switches S3 and S4 to decouple antenna 402 from NFC circuitry. Further, logic 412, upon receipt of the signal from frequency detector 410, may also convey one or more control signals to synchronous rectifier 514 to couple antenna 402 to wireless power circuitry 406. Moreover, when the wireless power transmitter is no longer detected (e.g., the electronic device is no longer positioned within the charging region), the wireless power functionality may be disabled (e.g., wireless power circuitry 406 may be decoupled from antenna 402) and the NFC functionality may be enabled (e.g., NFC circuitry 404 may be coupled to antenna 402).

Figure 9:
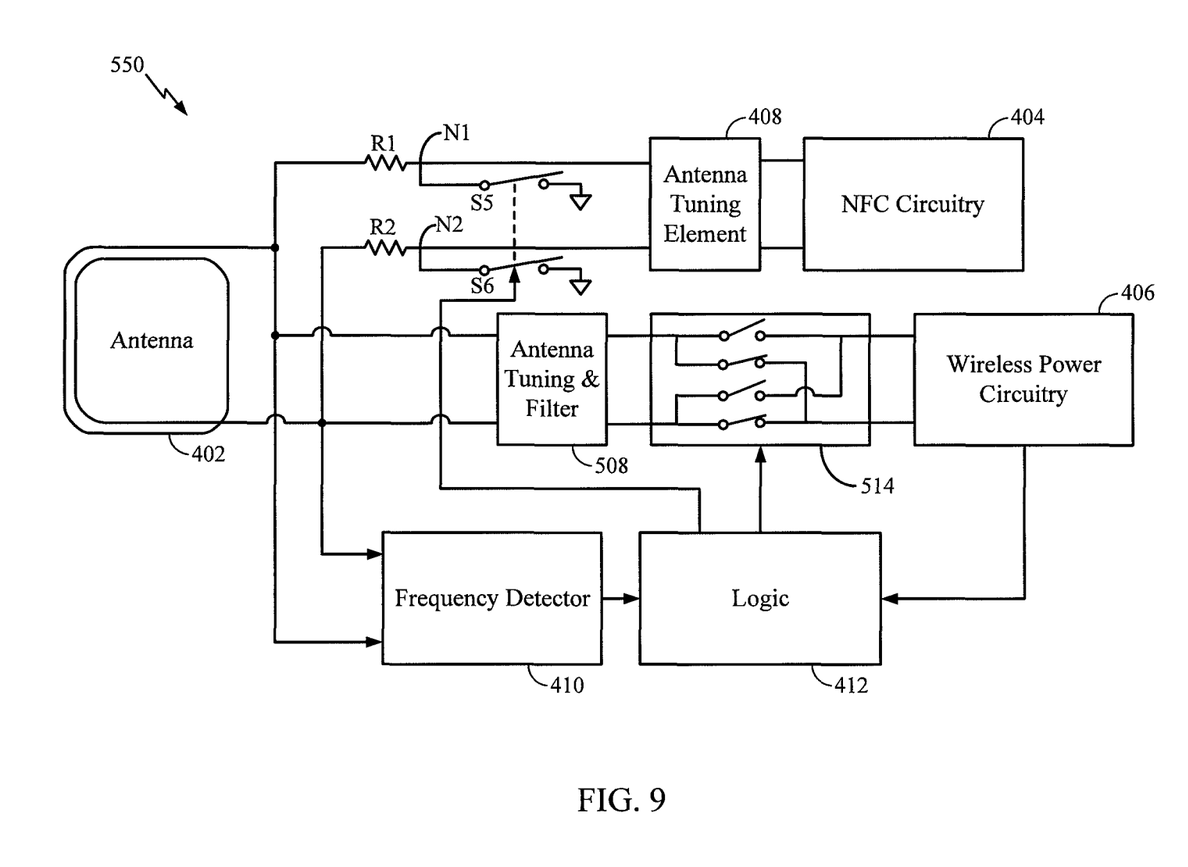
FIG. 9 depicts another receiver, according to an exemplary embodiment of the present invention.

FIG. 9 depicts another receiver 550, according to an exemplary embodiment of the present invention. Receiver 550 includes antenna 402, frequency detector 410, logic 412, NFC circuitry 404, wireless power circuitry 406, and antenna tuning element 408. Additionally, receiver 500 includes antenna tuning and filter element 508 and synchronous rectifier 514, each of which are coupled between antenna 402 and wireless power circuitry 406. As illustrated in FIG. 9, antenna 402 is operably coupled to each of frequency detector 410 and antenna tuning and filter element 508. Further, antenna 402 is operably coupled to NFC circuitry 404 via resistors R1 and R2 and antenna tuning element 408. In addition, receiver 550 may include switching elements S5 and S6, wherein switching element S5 is configured to couple a node N1 to a ground voltage and switching element S6 is configured to couple a node N2 to the ground voltage.

Similarly to receiver 400, receiver 550 may be configured to transition from an NFC mode to a wireless power mode upon detection of a wireless power transmitter. More specifically, logic 412, upon receipt of a signal from frequency detector 410, may convey one or more control signals to switches S5 and S5 to couple nodes N1 and N2 to the ground voltage. In addition, logic 412, upon receipt of the signal from frequency detector 410, may also convey one or more control signals to synchronous rectifier 514 to couple antenna 402 to wireless power circuitry 406. Moreover, when the wireless power transmitter is no longer detected (e.g., the electronic device is no longer positioned within the charging region), the wireless power functionality may be disabled (e.g., wireless power circuitry 406 may be decoupled from antenna 402) and the NFC functionality may be enabled (e.g., NFC circuitry 404 may be coupled to antenna 402).

Figure 10:
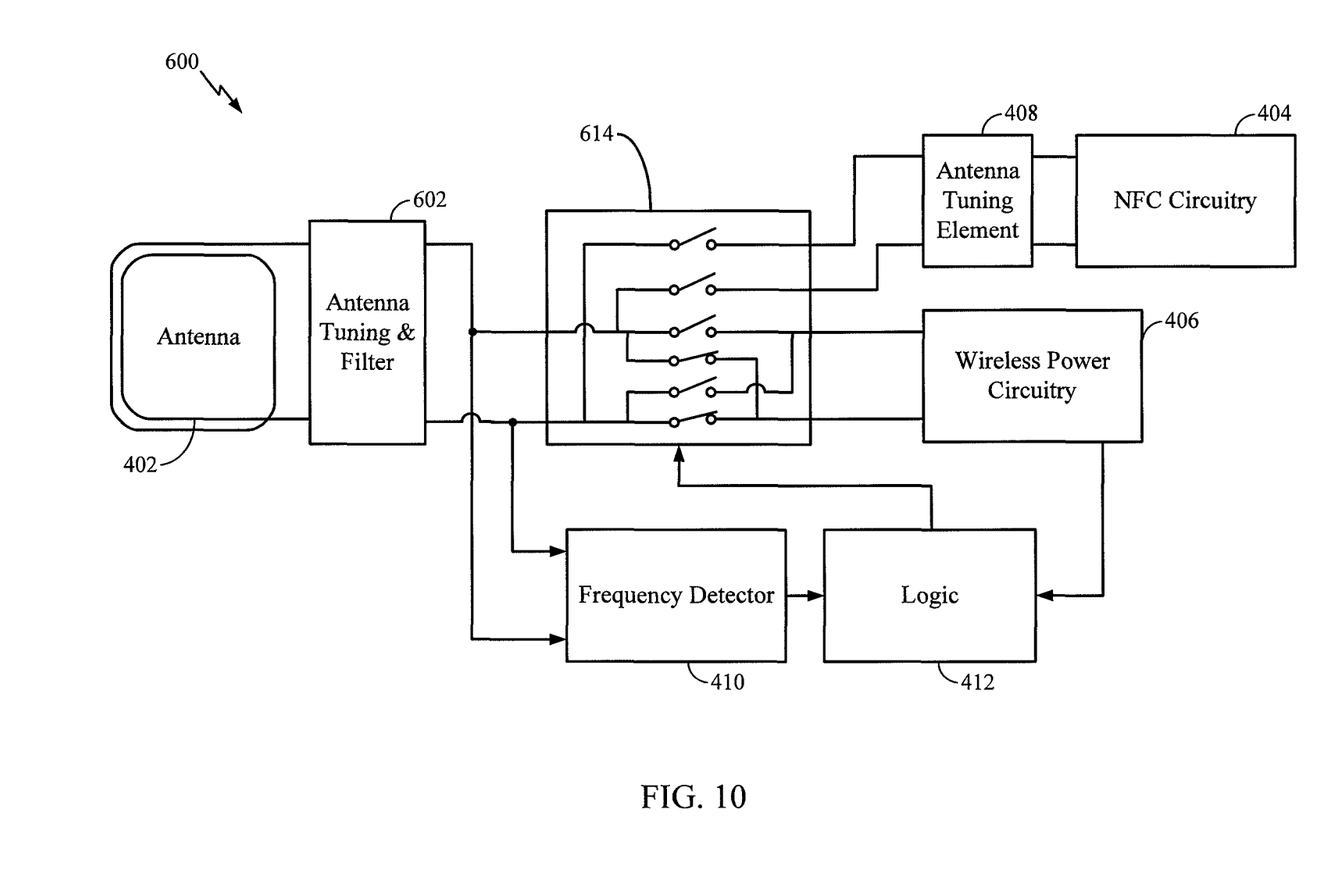
FIG. 10 illustrates another receiver, according to an exemplary embodiment of the present invention.

Another receiver 600, in accordance with an exemplary embodiment of the present invention, is illustrated in FIG. 10. Receiver 600 includes antenna 402, frequency detector 410, logic 412, NFC circuitry 404, antenna tuning element 408, and wireless power circuitry 406. Additionally, receiver 600 includes a tuning and filter element 602 and a synchronous rectifier 614. As illustrated, tuning and filter element 602 may be coupled between antenna 402 and each of synchronous rectifier 614 and frequency detector 410. Further, synchronous rectifier 614 may be coupled between antenna 402 and each of wireless power circuitry 406 and NFC circuitry 404.

Rectifier 614 may include a plurality of actively-controlled switches and may be configured to either selectively couple antenna 402 to NFC circuitry 402 or selectively couple antenna 402 to wireless power circuitry 406. Similarly to receiver 400, receiver 600 may be configured to transition from an NFC mode to a wireless power mode upon detecting the presence of a wireless power transmitter. More specifically, logic 412, upon receipt of a signal from frequency detector 410, may convey one or more control signals to synchronous rectifier 614 to couple antenna 402 to either NFC circuitry 404 (i.e., via antenna tuning element 408) or wireless power circuitry 406. For example, in one mode of operation (i.e., an NFC mode), rectifier 614 may be configured to selectively couple antenna 402 to NFC circuitry 404 and selectively decouple antenna 402 from wireless power circuitry 406. In another mode of operation (i.e., a wireless power mode), rectifier 614 may be configured to selectively couple antenna 402 to wireless power circuitry 406 and selectively decouple antenna 402 from NFC circuitry 406.

Figure 11:
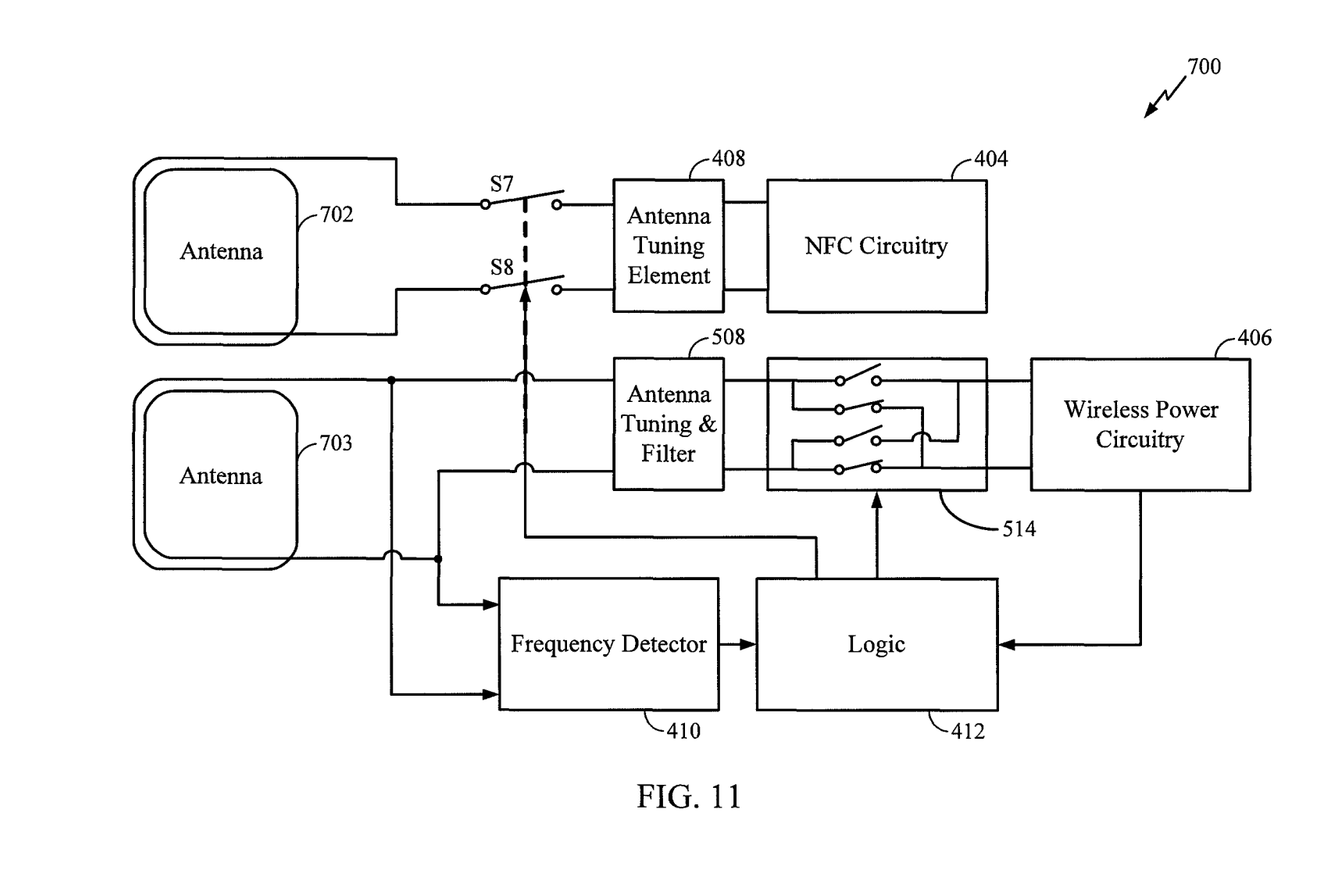
FIG. 11 illustrates yet another receiver, in accordance with an exemplary embodiment of the present invention.

FIG. 11 illustrates yet another receiver 700, according to an exemplary embodiment of the present invention. Receiver 700 includes an antenna 702, which is configured as an NFC antenna, and an antenna 703, which is configured as a wireless power antenna. Receiver 700 also includes antenna tuning element 408, antenna tuning and filter element 508, synchronous rectifier 514, frequency detector 410, and logic 412. It is noted that frequency detector 410 is coupled to antenna 703. Further, receiver 700 includes NFC circuitry 404 and wireless power circuitry 406. As illustrated in FIG. 11, antenna 702 is coupled to antenna tuning element 408 via switching elements S7 and S8. Similarly to receiver 400, receiver 700 may be configured to transition from an NFC mode to a wireless power mode upon detecting the presence of a wireless power transmitter. More specifically, logic 412, upon receipt of a signal from frequency detector 410, may convey one or more control signals to switching elements S7 and S8 to decouple antenna 702 from NFC circuitry 404. Further, logic 412, upon receipt of the signal from frequency detector 410, may also convey one or more control signals to synchronous rectifier 514 to couple antenna 402 to wireless power circuitry 406. Moreover, when the wireless power transmitter is no longer detected (e.g., the electronic device is no longer positioned within the charging region), the wireless power functionality may be disabled (e.g., wireless power circuitry 406 may be decoupled from antenna 402) and the NFC functionality may be enabled (e.g., NFC circuitry 404 may be coupled to antenna 402).

It is noted that the receivers described herein may include protection circuitry that may be enable to protect against large, potentially harmful voltages. For example, a receiver (e.g., receiver 400, 450, 500, 550, 600, and/or 700) may include at least one of a voltage limiter diode or the like, a transistor configured to short a signal to ground, and a transistor configured to open a connection between an NFC chip and an antenna when a large voltage appears.

Figure 12:
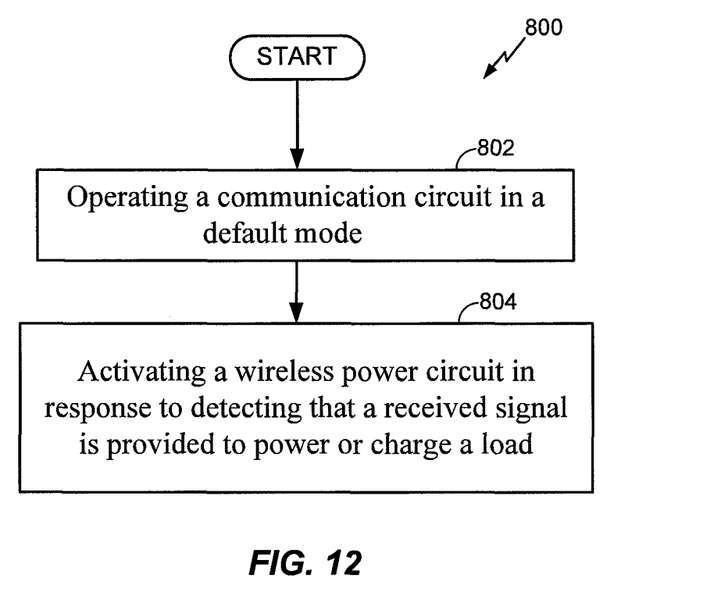
FIG. 12 is a flowchart illustrating a method, in accordance with an exemplary embodiment of the present invention.

FIG. 12 is a flowchart illustrating a method 800, in accordance with one or more exemplary embodiments. Method 800 may include operating a communication circuit in a default mode (depicted by numeral 802). Further, method 800 may include activating a wireless power circuit in response to detecting that a received signal is provided to power or charge a load (depicted by numeral 804).

Figure 13:
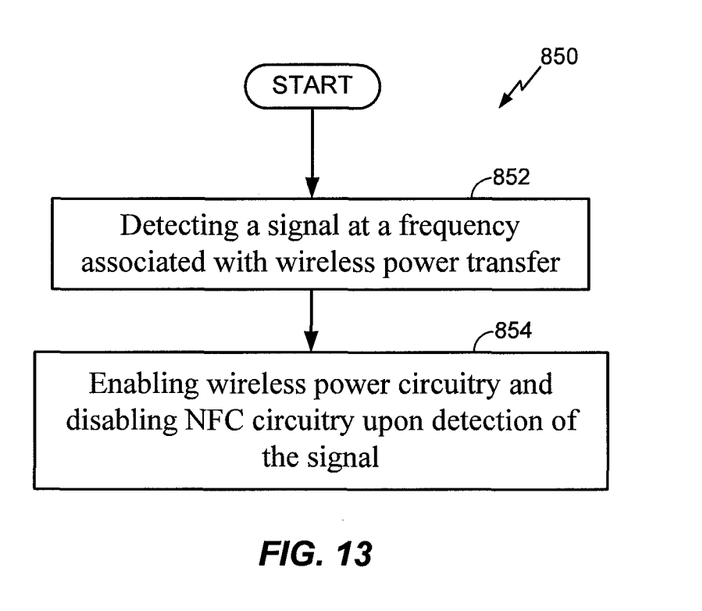
FIG. 13 is a flowchart illustrating another method, in accordance with an exemplary embodiment of the present invention.

FIG. 13 is a flowchart illustrating another method 850, in accordance with one or more exemplary embodiments. Method 850 may include detecting a signal at a frequency associated with wireless power transfer (depicted by numeral 852). Further, method 850 may include enabling wireless power circuitry and disabling NFC circuitry upon detection of the signal (depicted by numeral 854).

Exemplary embodiments as described herein enable for NFC functionality and wireless power functionality to coexist without degrading the performance of either. Further, exemplary embodiments provide for a methods and devices which do not require a user to manually switch modes.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
    an antenna configured to receive a signal;
    a frequency detector configured to detect a frequency of the signal and to determine if the signal is to power or charge a load based on the detected frequency, the detected frequency having a first frequency value if the signal is to power or charge the load, the detected frequency having a second frequency value if the signal is to communicate, the second frequency value different from the first frequency value;
    a communication circuit configured to selectively couple to the antenna in a default mode of operation;
    a wireless power circuit configured to selectively couple to the antenna in a wireless power mode based on the detected frequency having the first frequency value; and
    a controller configured to delay a transition from the default mode to the wireless power mode until an active communication by the communication circuit is finished.

2. The device of claim 1, wherein the communication circuit comprises a near field communication (NFC) circuit.

3. The device of claim 1, further comprising at least one switching element configured to selectively couple the communication circuit to the antenna and selectively couple the wireless power circuit to the antenna.

4. The device of claim 3, wherein the at least one switching element is configured to selectively decouple the wireless power circuit from the antenna in the default mode of operation and selectively decouple the NFC circuit from the antenna in the wireless power mode.

5. The device of claim 1, wherein the controller is coupled to the frequency detector and further configured to convey one or more signals to the at least one switching element to selectively couple the communication circuit to the antenna and selectively couple the wireless power circuit to the antenna based on a frequency value received from the frequency detector.

6. The device of claim 3, wherein the controller is further configured to convey one or more signals to the at least one switching element to selectively decouple the communication circuit from the antenna in the wireless power mode.

7. The device of claim 3, wherein the controller is further configured to convey one or more signals to the at least one switching element to selectively decouple the wireless power circuit from the antenna in the default mode.

8. The device of claim 1, wherein the frequency detector is configured to detect a frequency of substantially 6.78 MHz.

9. The device of claim 1, further comprising a synchronous rectifier coupled between the antenna and the wireless power circuit.

10. The device of claim 1, further comprising an antenna tuning element coupled between the antenna and the communication circuit.

11. The device of claim 1, further comprising an antenna tuning and filter element coupled between the antenna and the wireless power circuit.

12. The device of claim 1, wherein the controller is further configured to determine that a portion of the signal is not provided for communication and selectively couple the wireless power circuit to the antenna in the wireless power mode and based on the determination that a portion of the signal is not provided for communication such that priority is given to the wireless power mode when the signal is provided for communication.

13. The device of claim 1, wherein the antenna comprises a first antenna and a second antenna, and wherein the communication circuit is configured to selectively couple to the first antenna in the default operation, and wherein the wireless power circuit is configured to selectively decouple from the second antenna in the default operation, and wherein the communication circuit is configured to selectively decouple from the first antenna in the wireless power mode, and wherein the wireless power circuit is configured to selectively couple to the second antenna in the wireless power mode.

14. The device of claim 13, wherein the frequency detector is coupled to each of the first and second antenna.

15. The device of claim 14, wherein the frequency detector is configured to detect a frequency of substantially 6.78 MHz of the second antenna.

16. The device of claim 13, further comprising a synchronous rectifier coupled between the second antenna and the wireless power circuit.

17. The device of claim 13, further comprising an antenna tuning element coupled between the first antenna and the communication circuit and a filter element coupled between the second antenna and the wireless power circuit.

18. A method of processing a signal, comprising:
operating a communication circuit in a default mode;
detecting a frequency of the signal;
activating a wireless power circuit to operate in a wireless power mode in response to detecting that the signal is provided to power or charge a load based on the detected frequency, the detected frequency comprising a first frequency value if the signal is to power or charge the load, the detected frequency comprising a second frequency value if the signal is to communicate, the second frequency value different from the first frequency value; and
delaying activating the wireless power circuit in the wireless power mode until an active communication by the communication circuit is finished.

19. The method of claim 18, wherein the communication circuit comprises a near field communication (NFC) circuit.

20. The method of claim 18, wherein operating the communication circuit comprises coupling the communication circuit to an antenna and decoupling the wireless power circuit from the antenna.

21. The method of claim 18, wherein activating the wireless power circuit comprises coupling the wireless power circuit to an antenna and decoupling the communication circuit from the antenna.

22. The method of claim 18, wherein activating the wireless power circuit comprising coupling the wireless power circuit to an antenna and activating a protection circuit configured to prevent the signal from being received by the communication circuit.

23. The method of claim 18, wherein detecting a frequency of the signal comprises detecting a frequency of the signal of substantially 6.78 MHz.

24. The method of claim 18, further comprising decoupling the communication circuit from an antenna based on detecting of the signal at the frequency.

25. The method of claim 18, further comprising deactivating the wireless power circuit based on an absence of the signal at the first frequency.

26. The method of claim 18, further comprising activating the wireless power circuit based on both detecting that the signal is provided to power or charge the load and detecting that a portion of the received signal is not provided for communications such that priority is given when the signal is provided for communication.

27. The method of claim 18, further comprising:
detecting a second signal provided for communication; and
deactivating the wireless power circuit and operating the communication circuit based on the detecting of the second signal such that priority is given to the second signal.

28. A device, comprising:
means for receiving a signal;
means for communication configured to selectively couple to the means for receiving a signal in a default mode of operation;
means for detecting a frequency configured to detect that the signal is provided to power or charge a load based on the frequency, the detected frequency comprising a first frequency value if the signal is to power or charge the load, the detected frequency comprising a second frequency value if the signal is to communicate, the second frequency value different from the first frequency value; and
means for wirelessly receiving power configured to selectively couple to the means for receiving a signal in a wireless power mode in response to the detected frequency having the first frequency value; and
means for delaying a transition from the default mode to the wireless power mode until an active communication by the communication circuit is finished.

29. The device of claim 28, wherein the means for receiving a signal comprises an antenna.

30. The device of claim 28, wherein the means for communication comprises a near field communication (NFC) circuit.

31. The device of claim 28, wherein the means for wirelessly receiving power comprises a wireless power circuit.

32. The device of claim 28, further comprising means for selectively coupling the communication circuit to the means for receiving a signal and the wireless power circuit to the means for receiving a signal.

33. The device of claim 32, wherein the means for selectively coupling comprises a switching element.

34. The device of claim 32, wherein the means for selectively coupling is configured to selectively decouple the means for wirelessly receiving power from the means for receiving a signal in the default mode of operation and selectively decouple the means for communication from the signal receiving means in the wireless power mode.

35. The device of claim 28, further comprising means for conveying one or more signals to the means for selectively coupling to selectively couple the means for communication to the means for receiving a signal and selectively couple the means for wirelessly receiving power to the means for receiving a signal based on a frequency value received from the means for detecting a frequency.

36. The device of claim 28, further comprising means for conveying one or more signals to the means for selectively coupling to selectively decouple the means for communication from the means for receiving a signal in the wireless power mode.

37. The device of claim 28, further comprising means for conveying one or more signals to the means for selectively coupling to selectively decouple the means for wirelessly receiving power from the means for receiving a signal in the default mode.

38. The device of claim 28, wherein the means for detecting a frequency is configured to detect a frequency of substantially 6.78 MHz.

39. The device of claim 28, further comprising a synchronous rectifier coupled between the signal receiving means and the wireless power circuit.

40. The device of claim 28, further comprising means for tuning coupled between the means for receiving a signal and the means for communication.

41. The device of claim 28, further comprising means for tuning and means for filtering coupled between the means for receiving a signal and the means for wirelessly receiving power.

42. The device of claim 28, further comprising means for determining a portion of the signal is not configured for communication and means for selectively coupling the means for wirelessly receiving power to the means for receiving a signal in the wireless power mode based on a determination that a portion of the signal is not provided for communication such that priority is given to the means for wirelessly receiving power when the signal is provided for communication.

43. The device of claim 28, wherein the means for receiving a signal comprises a first antenna and a second antenna, and wherein the means for communication is configured to selectively couple to the first antenna in the default operation, and wherein the means for wirelessly receiving power is configured to selectively decouple from the second antenna in the default operation, and wherein the means for communication is configured to selectively decouple from the first antenna in the wireless power mode, and wherein the means for wirelessly receiving power is configured to selectively couple to the second antenna in the wireless power mode.

44. The device of claim 43, wherein the means for detecting a frequency is coupled to each of the first and second antennas.

45. The device of claim 44, wherein the means for detecting a frequency is configured to detect a frequency of substantially 6.78 MHz of the second antenna.

46. The device of claim 43, further comprising a synchronous rectifier coupled between the second antenna and the wireless power circuit.

47. The device of claim 43, further comprising means for tuning coupled between the first antenna and the means for communication and means for filtering coupled between the second antenna and the means for wirelessly receiving power.

* * * * *